(12) United States Patent
Komada (10) Patent No.: US 9,053,060 B2
(45) Date of Patent: Jun. 9, 2015

(54) INFORMATION PROCESSING APPARATUS HAVING FILE SYSTEM CONSISTENCY RECOVERY FUNCTION, AND CONTROL METHOD AND STORAGE MEDIUM THEREFOR

(75) Inventor: Yasuo Komada, Kashiwa (JP)

(73) Assignee: CANON KABUSHIKI KAISHA (JP)

( * ) Notice: Subject to any disclaimer, the term of this patent is extended or adjusted under 35 U.S.C. 154(b) by 296 days.

(21) Appl. No.: 12/851,157

(22) Filed: Aug. 5, 2010

(65) Prior Publication Data

US 2011/0078504 A1    Mar. 31, 2011

(30) Foreign Application Priority Data

Sep. 29, 2009    (JP) ................. 2009-224768

(51) Int. Cl.
*G06F 17/30*    (2006.01)
*G06F 11/14*    (2006.01)
*G06F 11/34*    (2006.01)

(52) U.S. Cl.
CPC ........ *G06F 11/1435* (2013.01); *G06F 11/3419* (2013.01)

(58) Field of Classification Search
USPC ......... 707/640, 661, 674, 675, 678, 685, 686, 707/999.202; 709/224–226, 219, 229; 370/252, 386, 242, 216; 719/321; 714/724
See application file for complete search history.

(56) References Cited

U.S. PATENT DOCUMENTS

| 6,629,200 | B1 | | 9/2003 | Kanamaru et al. | |
|---|---|---|---|---|---|
| 7,472,242 | B1 | * | 12/2008 | Deshmukh et al. | 711/162 |
| 7,526,551 | B1 | * | 4/2009 | Islam et al. | 709/226 |
| 7,836,025 | B1 | * | 11/2010 | Bali et al. | 707/687 |
| 2006/0064486 | A1 | * | 3/2006 | Baron et al. | 709/224 |
| 2006/0190772 | A1 | * | 8/2006 | Hanaoka et al. | 714/38 |
| 2007/0061279 | A1 | * | 3/2007 | Christiansen et al. | 707/1 |
| 2008/0270777 | A1 | * | 10/2008 | Thomas et al. | 713/1 |
| 2009/0037750 | A1 | * | 2/2009 | Boerger | 713/300 |
| 2009/0249031 | A1 | * | 10/2009 | Kobayashi | 712/30 |
| 2010/0037056 | A1 | * | 2/2010 | Follis et al. | 713/171 |

FOREIGN PATENT DOCUMENTS

| JP | 6214853 | A | 8/1994 |
|---|---|---|---|
| JP | 2001-117817 | A | 4/2001 |
| JP | 2005-234873 | A | 9/2005 |
| JP | 2007233963 | A | 9/2007 |
| JP | 2009044742 | A | 2/2009 |

OTHER PUBLICATIONS

Japanese Office Action dated Aug. 19, 2014 issued in corresponding Japanese Application No. 2010-202008.

* cited by examiner

*Primary Examiner* — Syling Yen
(74) *Attorney, Agent, or Firm* — Rossi, Kimms & McDowell LLP (57) ABSTRACT

An information processing apparatus able to recover consistency between file entity data and file management information when detecting an inconsistency therebetween at start-up of the apparatus, while reducing unavailable time of the apparatus as much as possible. A CPU of the information processing apparatus executes a base program stored in a storage unit to check for an abnormality in consistency between file entity data and file management information which are stored in another storage unit. If an abnormality is detected, the CPU executes a program for degeneracy operation stored in still another storage unit to perform a degeneracy operation, and recovers the consistency.

13 Claims, 7 Drawing Sheets

INFORMATION PROCESSING APPARATUS HAVING FILE SYSTEM CONSISTENCY RECOVERY FUNCTION, AND CONTROL METHOD AND STORAGE MEDIUM THEREFOR

BACKGROUND OF THE INVENTION

1. Field of the Invention

The present invention relates to an information processing apparatus having a file system consistency recovery function, and a control method and a storage medium therefor.

2. Description of the Related Art

At the present time, a disk medium such as a hard disk drive for storing programs, data, etc. is used in a copying machine, a facsimile machine, a printer, or other image processing apparatus (more generally, information processing apparatus).

To improve the speed of accessing programs and data, a cache memory is usually mounted on an image processing apparatus where a disk medium is used. Specifically, data to be written to the disk medium is temporally stored in the cache memory and then written to the disk medium in a writing order having been changed such as to minimize writing time. For example, in the case of a hard disk drive whose head movement waiting time and disk rotation waiting time are extremely long, writing time is shortened by changing the data writing order by means of a cache memory to improve an effective random writing speed (see, Japanese Laid-open Patent Publication No. 2001-117817).

In a Linux or other OS (operating system), at the time of writing information to a disk medium, information is not directly written to the disk medium, but to a buffer region on a memory other than the cache memory. The information written to the buffer region is written to the disk medium by a synchronization daemon activated by a kernel at background at intervals of a predetermined time period.

In an image processing apparatus where a disk medium is used, file management is performed by using software called a file system in order to easily access a file on the disk medium. Generally, for the file system, contents of files and management information of the files (hereinafter, respectively referred to as the entity data and the file management information) are stored on the disk medium. The file management information includes a table indicating storage positions of entity data of files on the disk medium, and includes file volume information and the like. By using the file management information, the entity data can easily be accessed (see, Japanese Laid-open Patent Publication No. 2005-234873).

If there is an inconsistency in the file system (between file entity data and file management information), a problem is faced in accessing the disk medium, resulting in a possibility of a fatal adverse effect on the entire file system. Accordingly, file system consistency is inevitably necessary for normal operation of the file system.

Next, a description will be given of an example file inconsistency in a file configuration where a file B is stored in a directory A.

In the case of this file configuration, file management information on the directory A includes information indicating that the file B is stored in the directory A, information on the position of the file B on the disk medium, and information on the volume of the file B. On the other hand, file management information on the file B includes information indicating that the file B is present in the directory A.

To erase the file B, the file management information on the file B is erased (procedure S1), the file management information on the directory A is updated (procedure S2), and the entity data of the file B is erased (procedure S3).

If it is assumed that power supply is shut off between the procedures S1 and S2 by artificial power off or accidental abnormality in commercial power supply, there is a possibility that the file management information on the file B is lost, but the information indicating that the file B is present in the directory A remains.

In that case, if the file B is accessed, the file management information on the directory A is referred to and it is indicated that the file B is present in the directory A. However, since the file management information on the file B cannot be referred to, the entity data of the file B cannot be accessed.

In another case that power supply is shut off between the procedures S2 and S3, if the disk medium is accessed real-time, the file management information on the directory A is updated before the power supply shutoff, so that it includes correct information indicating that the file B is not present in the directory A.

However, since the disk medium is accessed via the cache memory, even if the information in the cache memory is updated, the corresponding information in the disk medium is not updated in some cases depending on the timing of power supply shutoff.

In that case, as with the case where power supply is shut off between the procedures S1 and S2, there is a possibility that the file management information on the file B is lost from the disk medium, but the information indicating that the file B is present in the directory A remains in the disk medium.

If in this way there is an inconsistency in the file system, a problem is faced in accessing the disk medium, resulting in a possibility that the entire apparatus is brought into a crisis situation. To obviate this, in an apparatus mounted with a disk medium, the presence or absence of inconsistency between file entity data and file management information is generally inspected at start-up of the apparatus.

When an inconsistency between file entity data and file management information is detected, the file system checks the entire region of the disk medium in detail and attempts to recovery the consistency between file entity data and file management information. However, an extremely long time is required to perform the consistency recovery process, preventing a user to use the apparatus for a long time.

SUMMARY OF THE INVENTION

The present invention provides an information processing apparatus capable of recovering consistency between file entity data and file management information, when detecting inconsistency therebetween, while eliminating unavailable time of the apparatus as much as possible, and provides a control method and a storage medium for the information processing apparatus.

According to a first aspect of this invention, there is provided an image processing apparatus having a first storage unit that stores a first program and a second storage unit that stores a second program having less functions than the first program, which comprises a detection unit configured to detect a state of a file system of the first storage unit before the first program is executed, a recovery unit configured to recover the file system of the first storage unit in a case where the detection unit detects an abnormality in the file system of the first storage unit, a measurement unit configured to measure a time period elapsed from when the detection unit detects an abnormality in the file system of the first storage unit, and a control unit configured to execute the second program in a case where the time period measured by the measurement unit becomes greater than a predetermined value.

According to a second aspect of this invention, there is provided an image processing apparatus having a first storage unit that stores a first program and a second storage unit that stores a second program having less functions than the first program, which comprises a detection unit configured to detect a state of a file system of the first storage unit before the first program is executed, a recovery unit configured to recover the file system of the first storage unit, an estimation unit configured, in a case where the detection unit detects an abnormality in the file system of the first storage unit, to estimate a time period required for the recovery unit to recover the file system of the first storage unit, and a control unit configured to execute the second program in a case where the time period estimated by the estimation unit is greater than a predetermined value.

According to a third aspect of this invention, there is provided a control method for the image processing apparatus described in the first aspect.

According to a fourth aspect of this invention, there is provided a control method for the image processing apparatus described in the second aspect.

According to a fifth aspect of this invention, there is provided a storage medium storing a program for executing the control method described in the third aspect.

According to a sixth aspect of this invention, there is provided a storage medium storing a program for executing the control method described in the fourth aspect.

With this invention, when an inconsistency between file entity data and file management information is detected, consistency is recovered while eliminating the unavailable time of the apparatus as much as possible.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

Figure 1:
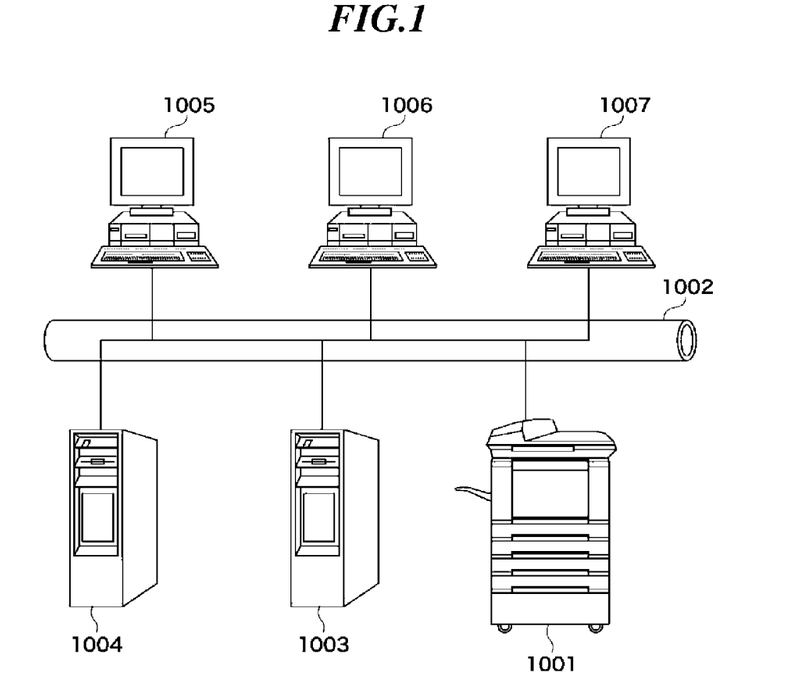
FIG. 1 is a view showing the construction of an image processing system to which this invention is applied.

FIG. 1 shows the construction of an image processing system to which this invention is applied.

In FIG. 1, reference numeral 1001 denotes an image processing apparatus (more generally, an information processing apparatus) that includes a scanner unit and a printer unit and is able to perform copying by reading images of originals and transmit image data to an external apparatus. Reference numeral 1003 denotes a file server/mail server (hereinafter, referred to as the server) that stores image data read by the image processing apparatus 1001 and has functions of an FTP server, NetWare server, SMB server, SMTP server, etc. Reference numeral 1004 denotes a facsimile server for transmission and reception of facsimile data.

Reference numerals 1005, 1006, and 1007 each denote a client computer for inputting and outputting image data from and to any of the image processing apparatus 1001 and the servers 1003, 1004 via an Ethernet (registered trademark) 1002.

Figure 2:
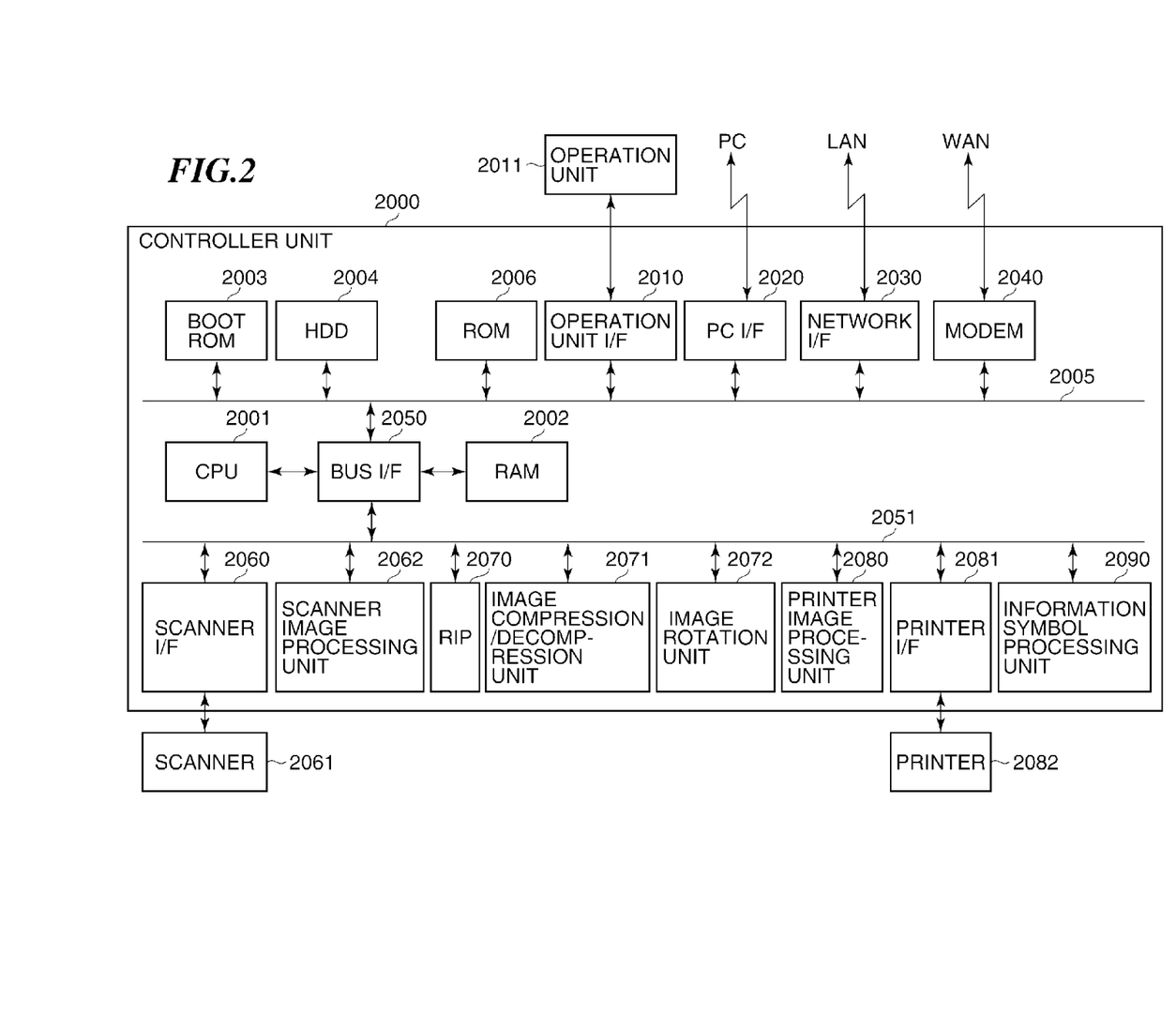
FIG. 2 is a block diagram schematically showing the hardware construction of the image processing apparatus shown in FIG. 1.

FIG. 2 schematically shows in block diagram the hardware construction of the image processing apparatus 1001. The image processing apparatus 1001 mainly includes a controller unit 2000, an operation unit 2011, a scanner 2061 which is an image input device, and a printer 2082 which is an image output device.

Next, the construction of the controller unit 2000 is described. Reference numeral 2001 denotes a CPU that controls the entire image processing apparatus. Reference numeral 2050 denotes a bus I/F that functions as a bus bridge for data structure conversion, to which the CPU 2001, a RAM 2002, a system bus 2005, and an image bus 2051 for high-speed image data transfer are connected.

The RAM 2002 is used as a system work memory for operation of the CPU 2001 and also used as an image memory for temporary storage of image data read by the scanner 2061, image data to be printed out by the printer 2082, and FAX transmission reception data, etc.

Next, a description is given of devices on the system bus 2005.

Reference numeral 2003 denotes a boot ROM that stores a program code (e.g., a group of instructions for boot operation of the CPU 2001), initial value data, table data, etc. A ROM 2006 stores a program for degeneracy operation (described later), etc.

Reference numeral 2004 denotes a hard disk drive (hereinafter, referred to as the HDD) that stores an operating system (OS), various program codes, table data, and image data. An operation unit interface 2010 is an interface unit with the operation unit 2011 having a touch panel, and outputs panel display data to the operation unit 2011 and conveys to the CPU 2001 information input by a user via the operation unit 2011. A PC interface 2020, a network interface 2030, and a MODEM 2040 are connected to respective ones of a PC, a LAN, and a public line, and are used for input and output of information.

Next, a description is given of devices on the image bus 2051.

A scanner I/F 2060 is a synchronous/asynchronous conversion interface with the scanner 2061. A scanner image processing unit 2062 performs image processing such as correction, modification, and editing on input image data. A raster image processor (RIP) 2070 decompresses a PDL code into a bit map image. An image compression/decompression unit 2071 compresses and decompresses multi-valued image data into and from JPEG, and compresses and decompresses binary image data into and from JBIG, MMR, or MH.

An image rotation unit 2072 performs rotation processing on image data. A printer image processing unit 2080 performs image processing such as printer correction and resolution conversion on print-output image data.

A printer I/F 2081 is a synchronous/asynchronous conversion interface with the printer 2082. An information symbol processing unit 2090 performs pattern matching and compression/decompression of a barcode, a two-dimensional code, or the like.

Figure 3:
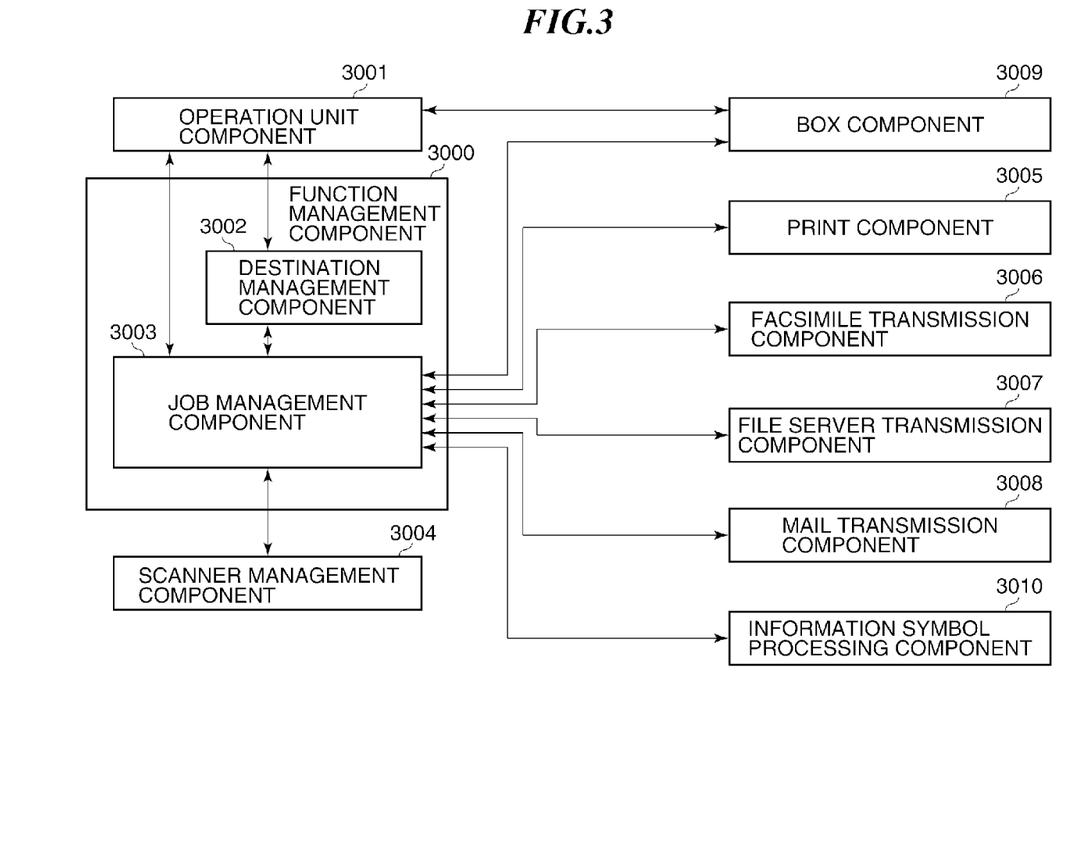
FIG. 3 is a block diagram showing the software construction of the image processing apparatus in FIG. 1.

FIG. 3 shows in block diagram the software construction of the image processing apparatus 1001. Respective software components in FIG. 3 are executed by the CPU 2001 of the controller unit 2000. An operation unit component 3001 acquires various information input by a user's operation on touch keys of the operation unit 2011. Information to be acquired in the case of copying includes information on the resolution of an image to be copied, monochrome/color designation, and the number of sheets to be copied. In the case of transmission, information to be acquired includes information on the resolution of an image to be transmitted, monochrome/color designation, transmission protocol, image format for transmission, transmission destination, additional text information, and information indicating whether the additional text information should be overlapped with the image. In some cases, the information to be acquired includes information indicating whether thumbnail images should be added, information indicating whether page numbers should be added, storage destination of read image, information for stored image selection, and information indicating whether encryption should be made.

Based on a processing instruction input via the operation unit component 3001, a function management component 3000 instructs a scanner management component 3004 to read an original. In the case of transmission, the function management component 3000 acquires destination information from a destination management component 3002, and issues an instruction to perform processing on read image data to a desired one of a print component 3005, facsimile transmission component 3006, file server transmission component 3007, mail transmission component 3008, box component 3009, and information symbol processing component 3010. By issuing a processing instruction, the function management component 3000 is able to, e.g., transmit an image file to the printer 2082 or the facsimile server 1004 or to store an image into the box component 3009.

By using three protocols (FTP, NetWare, and SMB), the file server transmission component 3007 converts a plurality of read images into one image file and transmits the image file to the file server 1003. The mail transmission component 3008 converts a plurality of read images into one image file and transmits the image file to the mail server 1004, by using a SMTP protocol. The information symbol processing component 3010 performs pattern matching and compression/decompression of a barcode, a two-dimensional code, or the like.

The function management component 3000 includes a job management component 3003 that performs job control between the destination management component 3002 and the scanner management component 3004 and between the destination management component 3002 and each of the transmission components. The box component 3009 transmits image data or the like to one of information storage regions, which are set beforehand in the hard disk 2004 of the image processing apparatus 1001 on a per user basis.

Next, a file inconsistency state inspection method is described. A file inconsistency state is inspected by using, e.g., a program called an FSCK (file system check) in the case of Linux. The FSCK program checks for the consistency of a file system and eliminates a detected inconsistency.

The FSCK consisting of phases 1 to 5 checks a file system a plurality of times.

In phase 1 to check blocks and sizes, type of inodes is checked, faulty or duplicate block is inspected, size of inodes is checked, and format of inodes is checked.

In phase 2 to check path names, mode and status of inodes are checked, inodes out of range are checked, a file represented by a faulty inode is checked, and file consistency is checked.

In phase 3 to check connectivity, a directory inspected in phase 2 is checked, and the presence or absence of a directory not referred to is checked.

In phase 4 to check reference counts, the presence or absence of file/link/directory is checked, link count is checked, a faulty or duplicate block in file or directory is checked, and the number of free inodes is checked.

In phase 5 to check cylinder groups, the presence or absence of inode that disappears from a busy inode map is checked, and the presence or absence of a free block that disappears from a free block map is checked. Furthermore, in phase 5, whether there is no free inode in the busy inode map is checked, whether the total number of free blocks is correct is checked, and whether the total number of busy inodes is correct is checked.

(First Embodiment)

Figure 4:
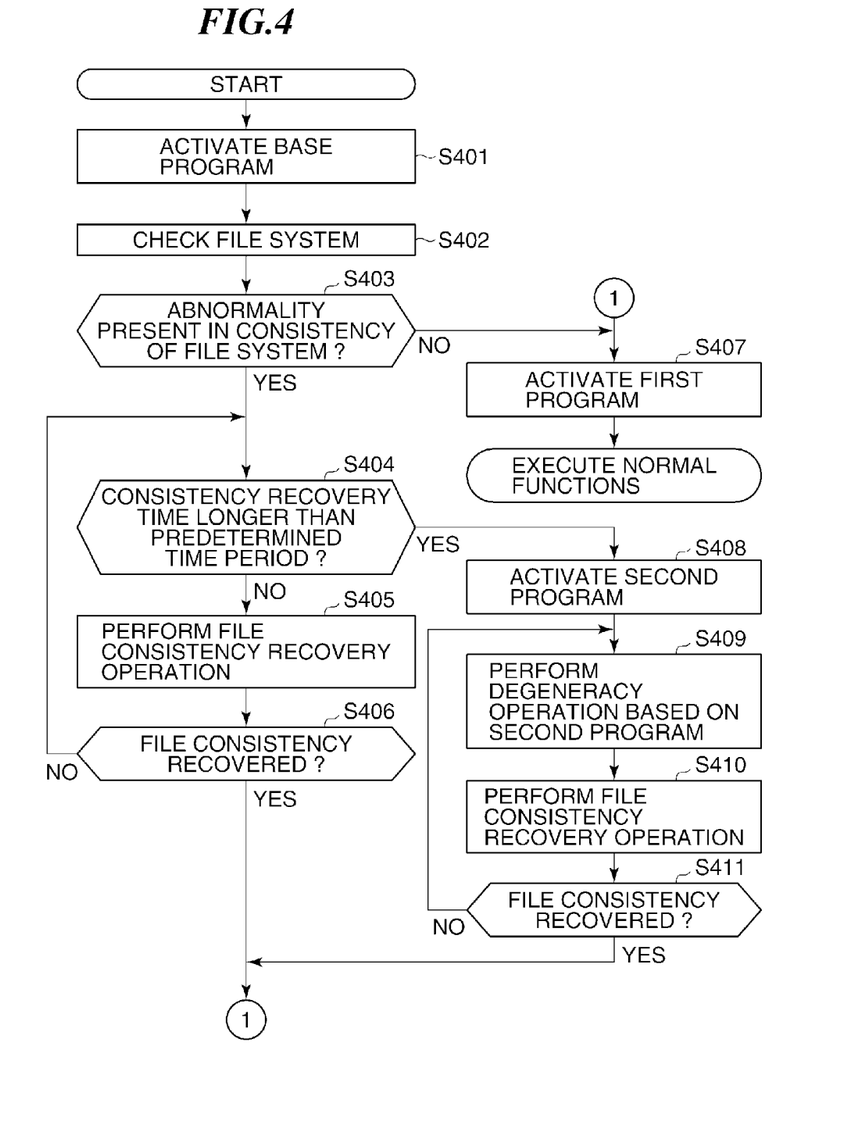
FIG. 4 is a flowchart showing a file system checking process according to a first embodiment of this invention.

Next, a file system checking system according to a first embodiment is described with reference to a flowchart shown in FIG. 4.

The CPU (central processing unit) 2001 loads a base program from the boot ROM 2003 and activates the base program (S401). The base program is a Linux or other OS and includes in particular a kernel part such as a boot program.

Next, the CPU 2001 executes the base program to thereby check for consistency between entity data of a file stored in the HDD 2004 and management information of the file (S402), and to determine whether there is an abnormality in consistency (S403).

If there is no abnormality in consistency, the CPU 2001 activates a first program in the HDD 2004 (S407). The first program corresponds to the components shown in FIG. 3 and is comprised of all the programs corresponding to various functions which are provided by the image forming apparatus 1001. Then, normal functions are executed by the first program.

On the other hand, if it is determined in S403 that there is an abnormality in consistency of the file, the CPU 2001 determines whether a consistency recovery operation execution time exceeds a predetermined time period (S404).

If the consistency recovery operation execution time does not exceed the predetermined time period, the CPU 2001 executes the base program to thereby perform a consistency recovery operation on the file (S405) and to determine whether the consistency recovery operation is complete so that the consistency is recovered (S406). It should be noted that the consistency recovery operation in S405 can be performed prior to executing the determination in S404.

If the consistency recovery operation is not complete, the flow returns to S404. If the consistency recovery operation is complete, the CPU 2001 proceeds to S407.

If it is determined in S404 that the consistency recovery operation execution time exceeds the predetermined time period, the CPU 2001 activates a second program for degeneracy operation in the ROM 2006 (S408), and performs a degeneracy operation based on the second program (S409).

The second program for degeneracy operation is a program for operating only predetermined ones among the components shown in FIG. 3. In a case, for example, that only the operation unit 2011 is to be operated in the degeneracy operation, the second program is constituted by a program that corresponds to the operation unit component 3001. As described above, the second program for degeneracy operation has less functions than the first program, and is executed on condition that the consistency recovery operation is not complete within the predetermined time period.

Next, the CPU 2001 continues to perform the consistency recovery operation for the file (S410). Then, the CPU 2001 determines whether the consistency recovery operation is complete so that the consistency is recovered (S411). If the consistency recovery operation is not complete, the CPU 2001 returns to S409. If the consistency recovery operation is complete, the CPU 2001 proceeds to S407.

In this way, in the first embodiment, if an abnormality in consistency between entity data of a file stored in the HDD 2004 and management information of the file is detected at the start-up of the apparatus and if a consistency recovery operation is not complete within the predetermined time period, the second program is executed to perform a degeneracy operation and at the same time the consistency recovery operation is continued. Thus, if an inconsistency between file entity data and file management information is detected, the consistency can be recovered thereafter while reducing the unavailable time of the apparatus as much as possible.

In the following, file system checking processes according to second to fourth embodiments of this invention will be described. Since the file system checking processes according to these embodiments are each basically the same as that of the first embodiment, only different points will be described below.

(Second Embodiment)

In the first embodiment, the second program is executed to perform the degeneracy operation and the consistency recovery operation is continued, if it is determined in S404 that the consistency recovery operation execution time exceeds the predetermined time period.

Figure 5:
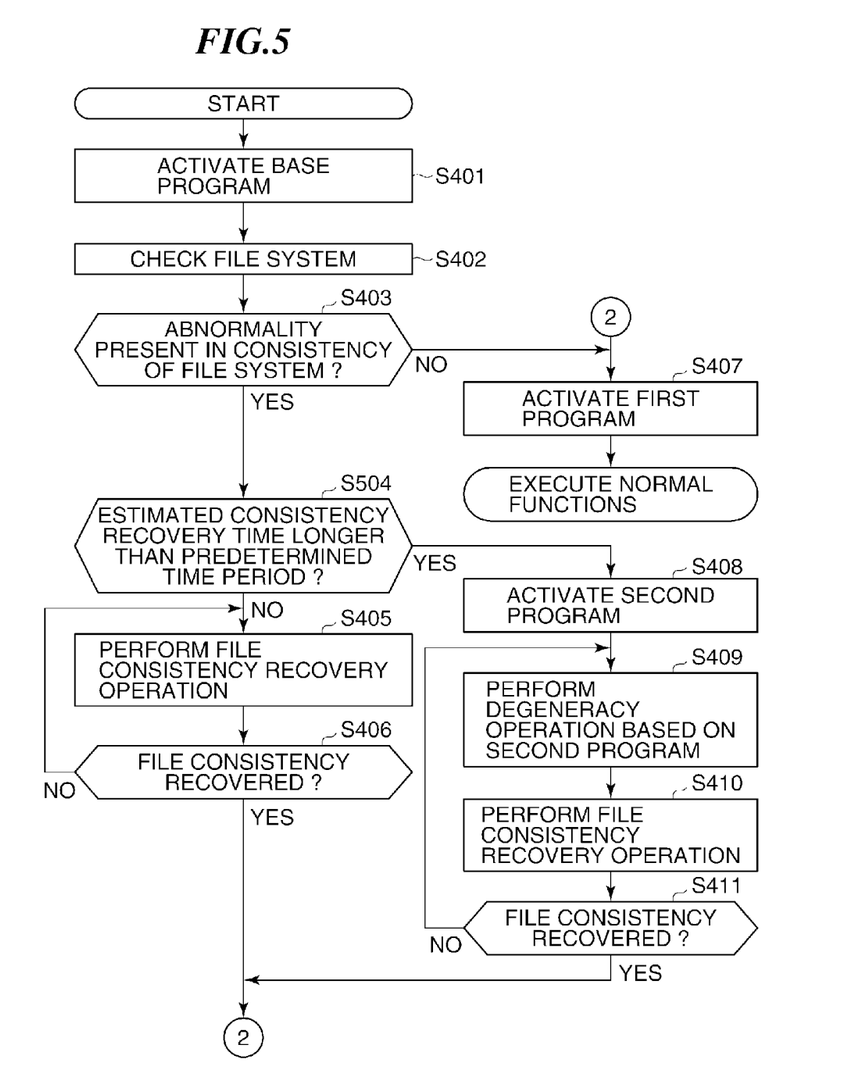
FIG. 5 is a flowchart showing a file system checking process according to a second embodiment of this invention.

On the contrary, in a second embodiment, the CPU 2001 estimates a time period required for the consistency recovery operation in S504 shown in FIG. 5. When determining in S504 that the estimated time exceeds a predetermined time period, the CPU 2001 executes the second program to perform the degeneracy operation. At the same time, the CPU 2001 performs the consistency recovery operation.

The process for estimating the time period required for the consistency recovery operation can be executed by FSCK. Specifically, inodes are checked, and the number of files, the number of directories, and the number of links are counted to determine the sum of the number of files, the number of directories, and the number of links. Subsequently, based on the number of checked files and a progress speed, a time period required for the checking is estimated from the number of remaining unchecked files.

In a case, as in the second embodiment, where the second program is executed to perform the degeneracy operation when it is determined that the estimated time exceeds the predetermined time period, the degeneracy operation can be performed from when the estimated time is determined as exceeding the predetermined time period. In the second embodiment, the unavailable time of the apparatus can be therefore shortened as compared to the first embodiment.

(Third Embodiment)

In the first and second embodiments, under an assumption that files are stored in the entire region of the HDD 2004, the entire region of the HDD 2004 is subjected to the consistency checking.

Figure 6:
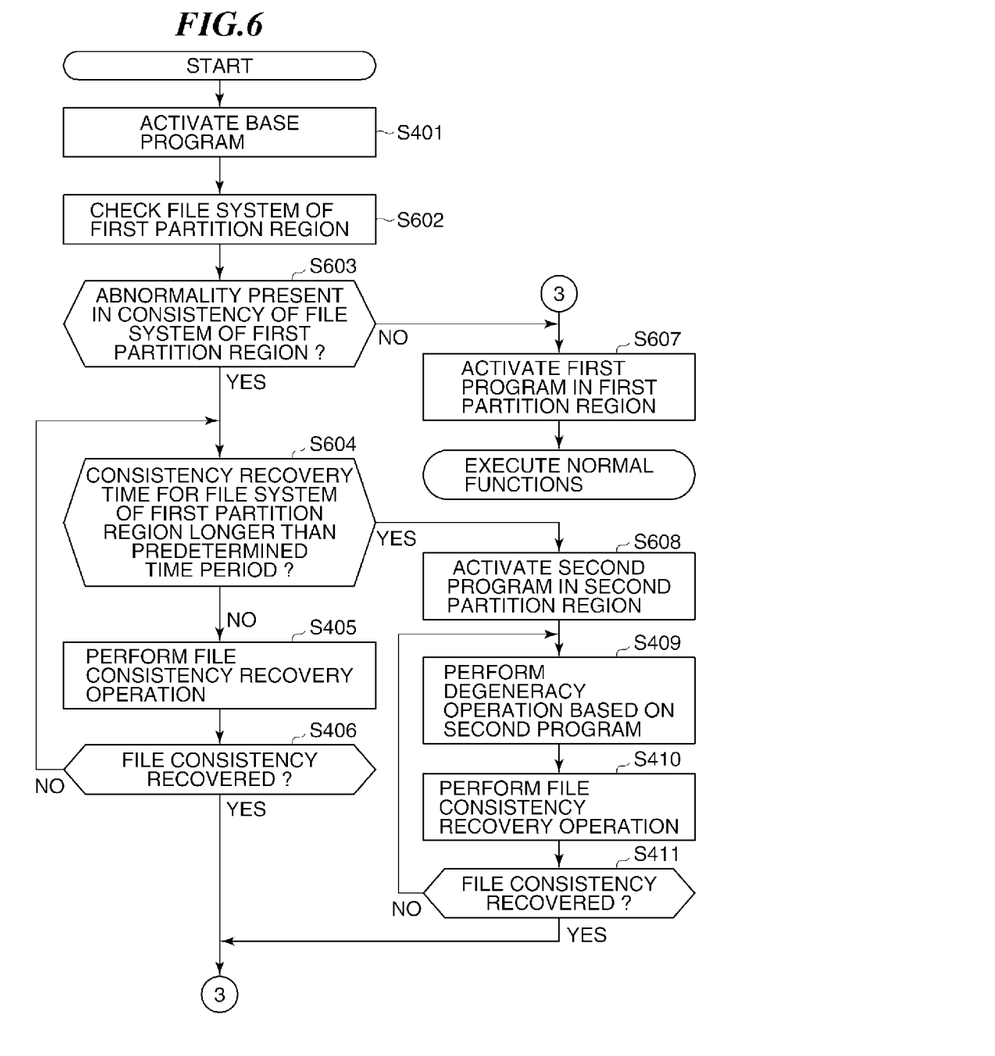
FIG. 6 is a flowchart showing a file system checking process according to a third embodiment of this invention.

On the contrary, in a third embodiment, it is assumed that the HDD 2004 is partitioned into a plurality of partition regions for multi-purpose uses. Specifically, it is assumed in the third embodiment that a first partition region of the HDD 2004 is used as a file storage region. Thus, the first partition region of the HDD 2004 is subjected to the processing in S602, S603, S604, and S607 in FIG. 6. It should be noted that the consistency recovery operation in S405 can be performed prior to executing the determination in S604.

In the third embodiment, it is assumed that a second partition region of the HDD 2004 is used as a storage region for the second program for degeneracy operation. The second program stored in the second partition region is activated in S608 in FIG. 6.

(Fourth Embodiment)

Figure 7:
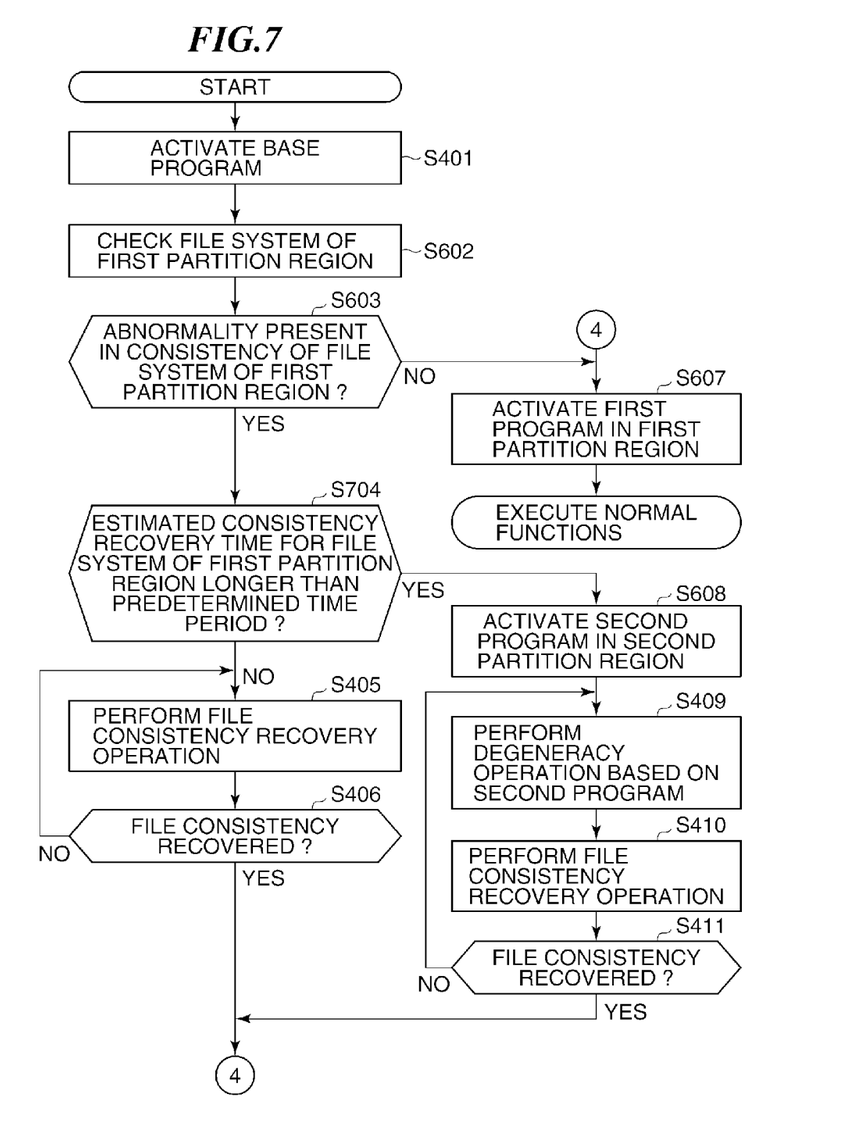
FIG. 7 is a flowchart showing a file system checking process according to a fourth embodiment of this invention.

A fourth embodiment differs from the third embodiment in that whether an estimated time exceeds a predetermined time period is determined in S704 in FIG. 7.

In the fourth embodiment, in a case where it is determined that the estimated time exceeds the predetermined time period, the second program is executed to perform the degeneracy operation, whereby the degeneracy operation can be performed from when the estimated time is determined as exceeding the predetermined time period. In the fourth embodiment, therefore, the unavailable time of the apparatus can be shortened as compared to the third embodiment.

(Other Embodiments)

The present invention is not limited to the first to fourth embodiments, and various modifications can be made. For example, in a case that the consistency is recovered during the second program being executed, it is possible to notify a user to that effect and to enable the user to instruct whether the second program must be continued to be executed or the first program must be executed instead of the second program. It is also possible to enable the user to instruct that the first and second programs must be executed simultaneously.

The predetermined time period in S404, S504, S604, and S704 can be input by the user via, e.g., the operation unit 2011. Technical concepts according to the first to fourth embodiments can also be applied to a case where an external storage unit other than the HDD is used as the file storage memory.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-224768, filed Sep. 29, 2009, which is hereby incorporated by reference herein in its entirety.

What is claimed is:

1. An information processing apparatus having a first storage unit that stores a first program and a second storage unit that stores a second program, for degeneracy operation, having less functions than the first program, comprising:

a hardware processor configured to execute the first program and the second program selectively;

a detection unit configured to detect a state of a file system of the first storage unit before the first program is executed by said processor;

a recovery unit configured to recover the file system of the first storage unit in a case where said detection unit detects an abnormality in the file system of the first storage unit; and a measurement unit configured to measure a time period elapsed from, in a case where said detection unit detects an abnormality in the file system of the first storage unit, the detection by the detection, wherein said processor executes the second program instead of the first program, whereby the information processing apparatus operates the degeneracy operation, in a case where the time period measured by said measurement unit becomes greater than a predetermined value, and wherein said recovery unit continues to recover the file system of the first storage unit, without said processor executing the second program, in a case where the time period measured by said measurement unit is less than the predetermined value.

2. The information processing apparatus according to claim 1, wherein said control unit executes the second program and causes said the recovery unit to continue to recover the file system of the first storage unit in a case where the time period measured by said measurement unit becomes greater than the predetermined value.

3. The information processing apparatus according to claim 1, wherein said control unit executes the first program in a case where said recovery unit completes recovery of the file system of the first storage unit.

4. The information processing apparatus according to claim 1, wherein said control unit executes the first program in a case where said detection unit does not detect an abnormality in the file system of the first storage unit.

5. An information processing apparatus having a first storage unit that stores a first program and a second storage unit that stores a second program, for degeneracy operation, having less functions than the first program, comprising:

a hardware processor configured to execute the first program and the second program selectively;

a detection unit configured to detect a state of a file system of the first storage unit before the first program is executed by said processor;

a recovery unit configured to recover the file system of the first storage unit; and an estimation unit configured, in a case where said detection unit detects an abnormality in the file system of the first storage unit, to estimate a time period required for said recovery unit to recover the file system of the first storage unit wherein said processor executes the second program instead of the first program, whereby the information processing apparatus operates the degeneracy operation, in a case where the time period estimated by said estimation unit is greater than a predetermined value;

wherein said recovery unit starts to recover the file system of the first storage unit, without said processor executing the second program, in a case where the time period estimated by said estimation unit is less than the predetermined value.

6. The information processing apparatus according to claim 5, wherein said control unit executes the second program and causes said the recovery unit to start to recover the file system of the first storage unit in a case where the time period estimated by said estimation unit is greater than the predetermined value.

7. The information processing apparatus according to claim 5, wherein said control unit executes the first program in a case where said recovery unit completes recovery of the file system of the first storage unit.

8. The information processing apparatus according to claim 5, wherein said control unit executes the first program in a case where said detection unit does not detect an abnormality in the file system of the first storage unit.

9. A control method for an information processing apparatus having a first storage unit that stores a first program and a second storage unit that stores a second program, for degeneracy operation, having less functions than the first program, and a hardware processor configured to execute the first program and the second program selectively, the method comprising the steps of:

(a) detecting a state of a file system of the first storage unit before the first program is executed by said processor;

(b) recovering the file system of the first storage unit in a case where an abnormality in the file system of the first storage unit is detected in said step (a);

(c) measuring a time period elapsed from when an abnormality in the file system of the first storage unit is detected in said step (a);

(d) executing, by said processor, the second program instead of the first program, whereby the information processing apparatus operates the degeneracy operation, in a case where the time period measured in said step (c) becomes greater than a predetermined value; and (e) continuing to recover the file system of the first storage unit, without said processor executing the second program, in a case where the time period measured in step (c) is less than the predetermined value.

10. A control method for an information processing apparatus having a first storage unit that stores a first program and a second storage unit that stores a second program, for degeneracy operation, having less functions than the first program, and a hardware processor configured to execute the first program and the second program selectively, the method comprising the steps of:

(a) detecting a state of a file system of the first storage unit before the first program is executed by said processor;

(b) recovering the file system of the first storage unit;

(c) estimating a time period required in said step (b) to recover the file system of the first storage unit in a case where an abnormality in the file system of the first storage unit is detected in said step (a);

(d) executing the second program instead of the first program, whereby the information processing apparatus operates the degeneracy operation, in a case where the time period estimated in said step (c) is greater than a predetermined value; and (e) continuing to recover the file system of the first storage unit, without said processor executing the second program, in a case where the time period estimated in said step (c) is less than the predetermined value.

11. A non-transitory storage medium storing a program for causing an information processing apparatus having a first storage unit that stores a first program and a second storage unit that stores a second program, for degeneracy operation, having less functions than the first program, and a hardware processor configured to execute the first program and the second program selectively, to execute the steps of:

(a) detecting a state of a file system of the first storage unit before the first program is executed by said processor;

(b) recovering the file system of the first storage unit in a case where an abnormality in the file system of the first storage unit is detected in said step (a);

(c) measuring a time period elapsed from when an abnormality in the file system of the first storage unit is detected in said step (a);

(d) executing, by said processor, the second program instead of the first program, whereby the information processing apparatus operates the degeneracy operation, in a case where the time period measured in said step (c) becomes greater than a predetermined value; and (e) continuing to recover the file system of the first storage unit, without said processor executing the second program, in a case where the time period measured in step (c) is less than the predetermined value.

12. A non-transitory storage medium storing a program for causing an information processing apparatus having a first storage unit that stores a first program and a second storage unit that stores a second program, for degeneracy operation, having less functions than the first program, and a hardware processor configured to execute the first program and the second program selectively, to execute the steps of:

(a) detecting a state of a file system of the first storage unit before the first program is executed by said processor;

(b) recovering the file system of the first storage unit;

(c) estimating a time period required in said step (b) to recover the file system of the first storage unit in a case where an abnormality in the file system of the first storage unit is detected in said step (a);

(d) executing the second program instead of the first program, whereby the information processing apparatus operates the degeneracy operation, in a case where the time period estimated in said step (c) is greater than a predetermined value; and (e) continuing to recover the file system of the first storage unit, without said processor executing the second program, in a case where the time period estimated in said step (c) is less than the predetermined value.

13. The information processing apparatus according to claim 5, wherein said estimation unit estimates the time period required for said recovery unit to recovery the file system based on the number of files, the number of directories, and the number of links, of the file system.

* * * * *